(12) United States Patent
Gettle

(10) Patent No.: US 11,135,473 B2
(45) Date of Patent: Oct. 5, 2021

(54) MEDIA HOLDER FOR EXERCISE MACHINE

(71) Applicant: NAUTILUS, INC., Vancouver, WA (US)

(72) Inventor: Jeffrey A. Gettle, Portland, OR (US)

(73) Assignee: Nautilus, Inc., Vancouver, WA (US)

(*) Notice: Subject to any disclaimer, the term of this patent is extended or adjusted under 35 U.S.C. 154(b) by 117 days.

(21) Appl. No.: 16/446,135

(22) Filed: Jun. 19, 2019

(65) Prior Publication Data
US 2020/0398106 A1 Dec. 24, 2020

(51) Int. Cl.
*A63B 22/00* (2006.01)
*A63B 71/06* (2006.01)

(52) U.S. Cl.
CPC ...... *A63B 22/0046* (2013.01); *A63B 71/0619* (2013.01)

(58) Field of Classification Search
CPC ............ F16M 11/041; A63B 2225/685; A63B 2071/0658; A63B 2225/687; A63B 71/0619
USPC ...................................................... 248/316.4
See application file for complete search history.

(56) References Cited

U.S. PATENT DOCUMENTS

| | | | |
|---|---|---|---|
| 6,959,899 B2* | 11/2005 | Yeh ...................... | F16M 11/041 248/316.4 |
| 8,469,325 B2* | 6/2013 | Yu ........................ | F16M 13/022 248/316.1 |
| 9,126,615 B2* | 9/2015 | Mersky ................. | B62B 3/1428 |
| 9,403,051 B2 | 8/2016 | Cutler | |
| 9,453,522 B2* | 9/2016 | Yu .............................. | F16B 2/18 |
| 9,695,977 B2* | 7/2017 | Blalock ................ | G03B 17/561 |
| 9,797,592 B2* | 10/2017 | Marcus ................ | H05K 5/0086 |
| 10,128,887 B2* | 11/2018 | Balmer ...................... | A45F 5/10 |
| 10,418,007 B2* | 9/2019 | Park ......................... | B65D 5/00 |
| 10,774,983 B2* | 9/2020 | Ehlis Pirretas ...... | F16M 13/022 |
| 2013/0206945 A1* | 8/2013 | Chen ...................... | F16M 13/00 248/316.4 |
| 2014/0367535 A1* | 12/2014 | Rost ....................... | F16M 13/00 248/122.1 |
| 2016/0176357 A1* | 6/2016 | Maslakow ............. | F16M 13/02 224/275 |
| 2017/0319941 A1* | 11/2017 | Smith ................... | A63B 21/153 |
| 2019/0052740 A1* | 2/2019 | Ormsbee ................. | H04M 1/04 |
| 2019/0083841 A1 | 3/2019 | Lin | |

(Continued)

FOREIGN PATENT DOCUMENTS

| | | |
|---|---|---|
| CN | 203139495 U | 8/2013 |
| CN | 206924323 U | 1/2018 |
| WO | 2017184517 A1 | 10/2017 |

OTHER PUBLICATIONS

International Search Report and Written Opinion for PCT/US2020/035743 dated Aug. 25, 2020.

*Primary Examiner* — Bradley Duckworth
(74) *Attorney, Agent, or Firm* — Dorsey & Whitney LLP

(57) ABSTRACT

A media holder for an exercise machine in accordance with some examples herein may include a first portion, a second portion movable relative to the first portion; and a size adjustment mechanism movably connecting the second portion to the first portion to enable resizing of a media holding region independent of whether a media item is present in the media holding region. The size adjustment mechanism may include an arm pivotally coupled to the second portion and configured to selectively engage the first portion in a plurality of positions.

20 Claims, 15 Drawing Sheets

(56) References Cited

U.S. PATENT DOCUMENTS

2019/0258142 A1\* 8/2019 Liu ...................... G03B 17/563
2020/0232598 A1\* 7/2020 Roudaut .............. F16M 11/041

\* cited by examiner

MEDIA HOLDER FOR EXERCISE MACHINE

FIELD

The present disclosure relates generally to exercise machines and more specifically to a size-adjustable media holder for an exercise machine to enable the user to position and secure media items of different sizes to the exercise machine.

BACKGROUND

Stationary exercise machines such as treadmills, elliptical machines, stair climbers, bicycles, and the like are ubiquitous in homes, recreation centers, and fitness clubs throughout the world. They are an important element in people's fitness regimen. Media items such as magazines, books, newspapers, and mobile computing devices e.g., smart phones, audio-visual media players, tablets, and e-readers are often used in conjunction with exercise equipment for various purposes. For example, media items can be used, for example, for entertainment, tracking of one's fitness regiments, or engaging in a social exercise environment. As examples, a user can use one's mobile device can track the user's vital statistics such as calories burned, pulse rate, weight. Electronic devices, such as mobile devices and other multi-media devices, and non-electronic devices such as books, magazines, and newspapers can provide entertainment for the user while exercising, e.g., delivering reading material, music, video entertainment, or games. Additionally, mobile devices can be integrated with the exercise equipment to provide a virtual exercise environment. To avoid having to hold one's media item, particularly at times when both hands may be required for operation of the machine, and/or to avoid dropping or otherwise damaging one's media item during exercise, exercise machines often include an integrated tray for placing one's media item on the machine. However, such trays may not fully secure the media item to the machine and/or position the media item at a location or orientation convenient for consumption of the media during use of the machine. Moreover, such trays are typically not customizable to securely hold differently sized items but are often a "one size fits all." Therefore, designers and manufacturers of exercise machines continue to seek improvements to components thereof, including to the media racks or trays of the exercise machine.

SUMMARY

An exercise machine with an adjustable media holder is described. The media holder may include two portion (e.g., two housing portions, which may be configured to support respective opposite ends of a media item), at least one of which is movable relative to the other for adjusting a size of a media holding region. For example, a first portion of the media holder may include a first support configured to support one end of a media item and a second portion of the media holder, which is moveably coupled to the first portion, may include a second support configured to support an opposite end of the media item such that a media holding region is defined between the first and second supports. The first and second portions of the media holder may be movably (e.g., slidably) coupled to one another, for example using a size adjustment mechanism, for adjusting a dimension (e.g., a vertical dimension or height) of the media holding region. In some embodiments, the size adjustment mechanism may be configured to remain in any of the adjusted configurations irrespective of whether a media item is present in the media holding region. For example, the size adjustment mechanism may include a retention mechanism that positions and holds the movable portion of the media holder in an adjusted position independent of whether a media item is placed and supported by the two portions of the media holder. The size adjustment mechanism may thus be configured to retain the second portion in any of a plurality of positions with respect to the first portion irrespective of the presence of a media item in the media holding region.

A size adjustment mechanism for a medial holder according to the present disclosure may include a friction member coupled to the first portion and configured to frictionally engage an arm coupled to the second portion such as to resist movement of the second portion relative to the first portion. In some embodiments, the friction member may include an elastomeric pad fixed to the first portion of the media holder. In embodiments, the friction member may include any suitable material and/or structure that provides sufficient friction, particularly static friction, to resist movement of the second portion relative to the first portion when the friction member and arm are engaged. In some embodiments, the arm may be pivotally coupled to the second portion of the media holder with a first end of the arm being biased toward the friction member (e.g., elastomeric pad). In other embodiments, the size adjustment mechanism may be configured to hold the adjusted position using a ratchet mechanism. In some such embodiments, an arm of the size adjustment mechanism may include a pawl configured to selectively engage one or more teeth fixed to the other portion of the media holder. In embodiments of the media holder, the second end of the arm opposite the first end may be configured for actuation by a user of the exercise machine such as to disengage the arm from the friction member.

In some embodiments, the first support of the media holder may be associated with the lower portion of the media holder and may include a ledge extending from a lower end of the lower portion. The second support may be associated with the upper portion and may include a ledge extending from an upper end of the upper portion. In some such embodiments, the upper portion of the media holder may be the movable portion. In some embodiments, a free end portion of one of the upper and lower ledges may be oriented toward the other one of the upper and lower ledges. For example, the respective ledge or a portion thereof may be angled or curved towards the opposite ledge, which may aid with securing the media item more firmly to the media holder.

In some embodiments, the media holder may include one or more additional support structures (e.g., a third support) that perform functions associated with securing a media item to the media holder. For example, a third support may be coupled to one of the two portions, for example the movable portion, and may be configurable to define a media holder region which has a dimension (e.g., a vertical height) that is smaller than the corresponding dimension of the media holder when provided in its fully collapsed configuration. In some embodiments in which the movable portion is the upper portion, the third support may be coupled to and thus movable with the upper portion. The third support may be movably coupled to the upper portion to enable it to move between a retracted and extended configuration. For example, the third support may be biased (e.g., using a spring) toward its extended configuration and thus toward the media holding region. The biasing force may be sufficiently low (e.g., a sufficiently soft spring may be used) such that securing a media item between the upper and lower supports compresses the third (or rear support) into the retracted position. When extended, the third support may be configured to support an edge (e.g., an upper or lower edge) of the media item. In one embodiment, the third support may be implemented as a plate or panel pivotally coupled, at its upper end, to the upper movable portion of the media holder such that, when the third support is in its extended position, the lower edge of the plate or panel overlaps the upper edge of the media item for securing the media item between the lower ledge of the media holder and the lower edge of the third support.

In one embodiment, the media holder includes a first portion configured to support one end of a media item; a second portion configured to support an opposite end of the media item, wherein the first portion and the second portion are slidably coupled to one another; and a size adjustment mechanism slidably coupling the first and second portions, the size adjustment mechanism includes an arm pivotally coupled to one of the first and second portions and configured to selectively engage a retention member fixed to the other one of the first and second portions, wherein the size adjustment mechanism is configured to retain the second portion in a plurality of different positions relative to the first portion. In some embodiments, the retention member includes a plurality of teeth and the arm includes a pawl configured to engage the teeth. In some embodiments, the first portion includes a friction pad selectively engageable with the arm to define the plurality of positions of the second housing portion relative to the first housing portion.

In some embodiments, the first portion includes a first housing portion enclosing the retention member, and the second portion includes a second housing portion configured to provide access to an end of the arm opposite the retention member. In some embodiments, the first support includes a first ledge extending from the first housing portion; the second support includes a second ledge extending from the second housing portion; and at least one of the first and second ledges extends towards the other one of the first and second ledges such that the dimension of the media holding region decreases with distance away from the first and second housing portions. In some embodiments, the first portion includes a first support and the second portion comprises a second support, and a media holding region is defined between the first and second supports. Movement of the second portion in relation to the first portion adjusts a height of the media holding region.

In some embodiments, a mount is fixed to the first portion and couples the media holder to a frame of the exercise machine. In some embodiments, the exercise machine may include a frame, which supports an exercise assembly including at least one movable component configured to be driven by a user during exercise, and further supports a media holder according to any of the examples herein.

BRIEF DESCRIPTION OF THE DRAWINGS

The description will be more fully understood with reference to the following figures in which components may not be drawn to scale, which are presented as various examples of the exercise machine described herein and should not be construed as a complete depiction of the scope of the exercise machine.

DETAILED DESCRIPTION

Figure 1:
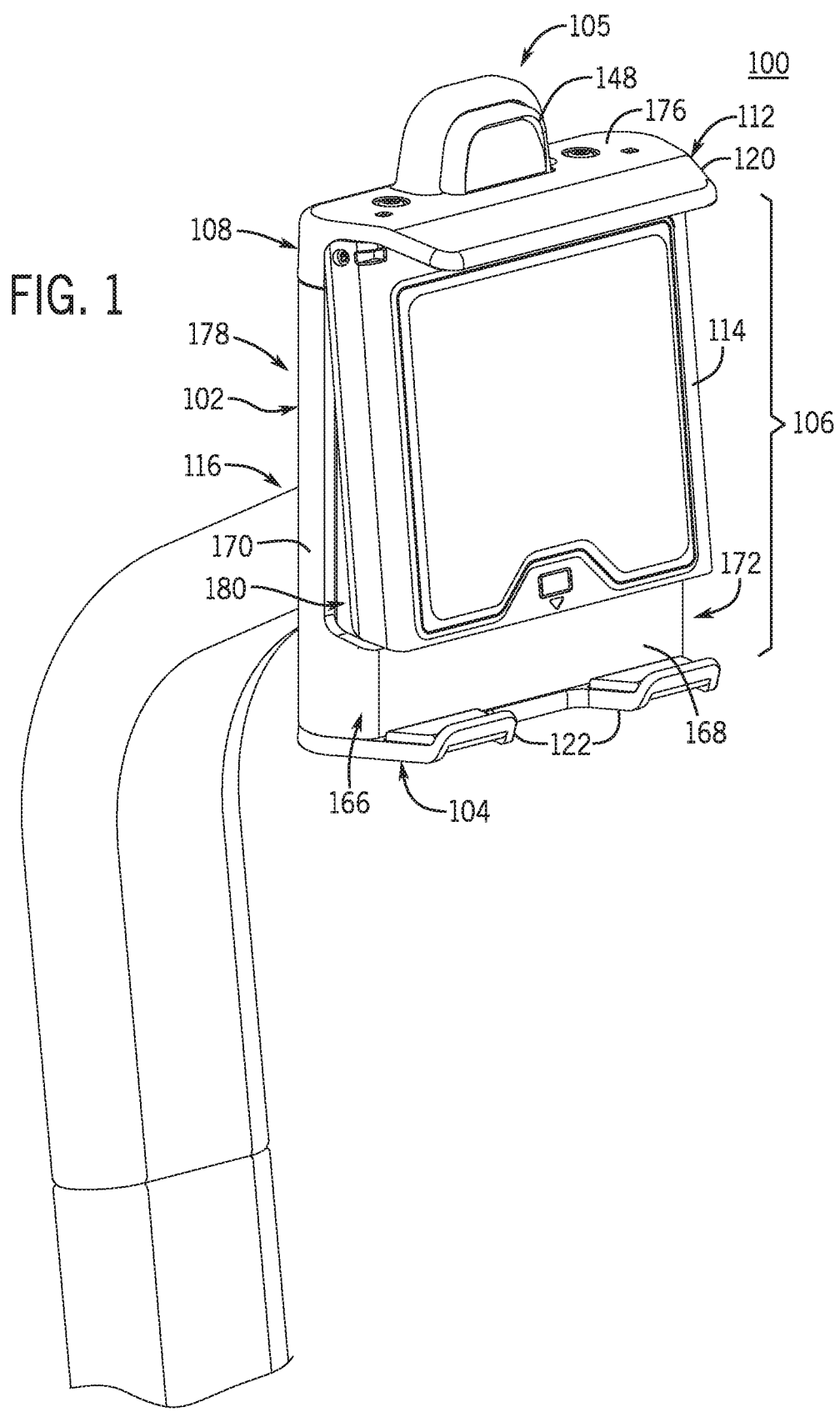
FIG. 1 is an isometric view of a media holder of an exercise machine according to the present disclosure.
Figure 2:
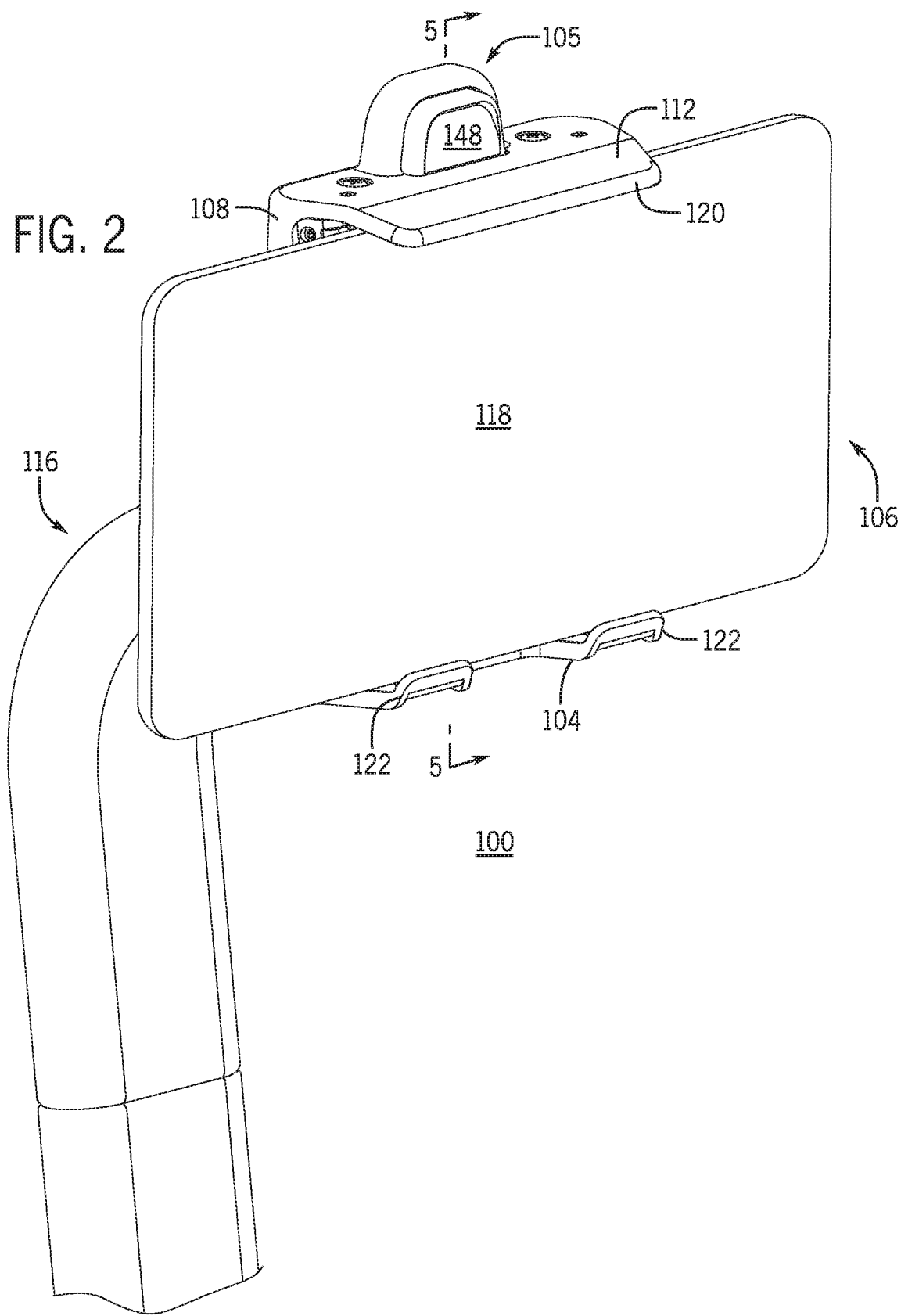
FIG. 2 is an isometric view of the media holder of FIG. 1, shown holding a media item.

Exercise machines, such as stationary exercise machines like elliptical trainers, stair climbers, or treadmills, typically include a console, which in some cases may include a rack for supporting a separate media item of the user during exercise. Described herein are examples of a media holder, which may be used to support and/or secure a media item to a stationary exercise machine. The media holder is adjustable to hold a variety of differently sized media items.

A media holder according to the present disclosure may include a first (e.g., lower) portion and a second (e.g., upper) portion, which are movably coupled to another other. One of the first and second portions, for examples, the lower portion, may be fixed to a mount for coupling the media holder to the exercise machine, and this portion may thus be referred to as the fixed portion. In some examples, the mount may be fixed to the exercise machine, thus rigidly coupling the fixed portion of the media holder to the exercise machine. In other examples, the media holder may be movably (e.g., adjustably) coupled to the exercise machine, for example allowing the media holder to be extended, retracted, or pivoted to change the position or orientation of the media holder with respect to the frame of the exercise machine. That is, the mount may be a fixed mount in some examples, or an adjustable mount (e.g., rotatable as shown e.g., in FIGS. 13 and 14 for adjusting the orientation of the media holder) in other examples.

The other one of the two portions, e.g., the upper portion, may be movable relative to the first (e.g., lower) portion and thus interchangeably referred to herein as the movable portion. In use, movement of the movable portion relative to the fixed portion of the medial holder allows a user to adjust a media-holding region of the media holder to enable the media holder to accept and hold media items of different sizes. To that end, the media holder may include a size adjustment mechanism operatively coupling the movable to the fixed portion to enable the selective adjustment of the size of the media holding region. The size adjustment mechanism may be configured to enable repositioning the movable portion in relation to the fixed portion and further enable retaining or holding the movable portion in the new or adjusted position. The retention of the movable portion into the adjusted position may be achieved, in some examples, by a friction-based mechanism (e.g., a friction brake). Other types of retention mechanisms (e.g., a ratchet type mechanism, mechanical and/or magnetic latches or other) may be used in other examples. In some examples, the retention mechanism is configured to retain the adjusted position between the movable and fixed portions irrespective or independent of whether a media item is present in the media holding region. In other examples, the media item may cooperate with the media holding apparatus to retain the movable portion in the adjusted position.

The size adjustment mechanism may include cooperating engagement or retention features that holds the relative position of the two portions of the media holder. The size adjustment mechanism may further include an actuator operatively associated with an engagement or retention feature of the size adjustment mechanism to allow the user to disengage or release the retention feature and thus enable adjustments to the size of the media holding region. In some examples, the size adjustment mechanism may include a lever arm (or simply arm) pivotally coupled to the movable portion. One end of the arm selectively engages the fixed portion of the media holder, in any of a plurality of positions, for adjusting the size of the media holding region. The lever arm may include an engagement member (e.g., a friction member such as a pad) that engages with a cooperating engagement member (e.g., another friction member such as a friction sheet or plate) on the fixed portion to retain the movable portion in the adjusted position. In other embodiments, the cooperating engagement members may be provided by a toothed plate and a pawl configured to engage the teeth. The opposite end of the lever arm may be accessible to the user and function as the actuator of the size adjustment mechanism.

The media holder may be configured to support a media item between first and second supports (e.g., first and second ledges) operatively associated with respective one of the first and second portions of the media holder. In some embodiments, one or more of the ledges or at least a portion thereof (e.g., a free end portion) may be oriented (e.g., angled or curved) toward the media holding region and thus toward the opposite ledge, which may facilitate a more secure retention of the media item in the media holder. In some examples, the media holder may include yet other supports, such as a rear support. The rear support may be configured to extend toward the media-holding region from a location between the first and second ledges and may thus facilitate defining yet smaller media holding regions than the media holding region of the fully collapsed configuration of the media holder. In this manner, a media item having a smaller size than the fully collapsed size of the media holder, or oriented with their smaller dimension vertically (e.g., a smart phone in landscape orientation) may be secured to the media holder.

Figure 15:
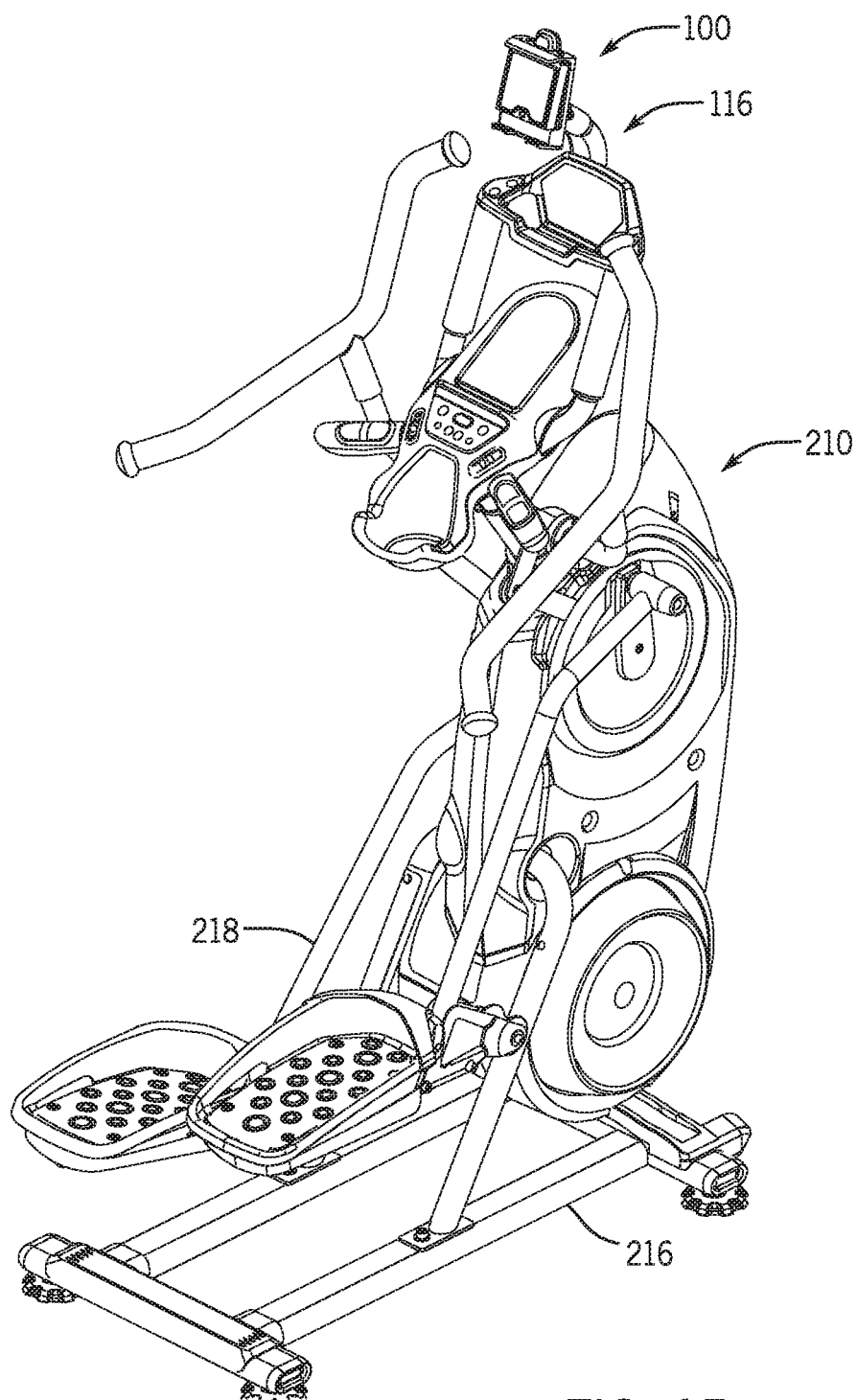
FIG. 15 is an isometric view of an exercise machine with a media holder according to the present disclosure.

FIGS. 1-11 show views of a media holder 100 in accordance with examples of the present disclosure. As described herein, the media holder 100 is configured to receive and hold differently sized media items and as such, the media holder 100 may also be referred to as a size-adjustable or simply adjustable media holder 100. The media holder 100 may be coupled to an exercise machine, such as a stationary exercise machine 210, and example of which is shown in FIG. 15, or to a non-stationary machine, or other support structure such as a frame supported on a floor, a wall, or other building component. As shown in FIG. 15, the exercise machine 210 may include a frame 216 for supporting the machine on a support surface (e.g., the floor) and for further supporting one or more movable components (e.g., pedals, foot links, handles, row bar, etc.) of an exercise assembly 218 that may be driven by the user during exercise. The media holder 100 may be coupled to the exercise machine 210 via the mount 116, which in some examples fixes the media holder 100 in relation to the frame 216 of the machine 210. The media holder 100 may be coupled to any of a variety of different types of stationary exercise machines including but not limited to stationary bikes, rowers, tread climbers, treadmills, elliptical, or other, or to non-stationary exercise machines or other structures (e.g., a media holder stand). The mount 116 may be configured to position the media holder 100, and thus a media item 118, for example a book, a magazine, or a mobile computing device (e.g., smart phone, tablet, laptop, e-reader, video player, audio player, or other electronic media device), when held by the media holder, in a suitable location on the machine 210, for example a location in which the media item is in a comfortable line of sight of the user during exercise. The mount 116 may include one or more elongate members (e.g., tubes), which may extend from a frame component of the exercise machine 210 to operatively position the media holder 100 on the machine 210. In some examples, the media holder 100 may be integrated into a console or other component of the exercise machine 210, and thus the mount 116 may be part of the structure of the exercise machine or omitted altogether.

As illustrated for example in FIGS. 1-4, the media holder 100 may include a first portion 102, shown as lower portion 102, and a second portion 108, shown as upper portion 108, movably coupled to one another. In this example, the first portion 102 is fixed to the mount 116, and the second portion 108 is movably coupled to the first housing portion 102, and thus also to the mount 116, for adjusting a dimension or size (e.g., a height) of the media holding region 106. Thus, in the context of the present example, the first portion 102 may be interchangeably referred to as the fixed and/or the lower portion 102, while the second portion 108 may be interchangeably referred to as the movable and/or upper portion 108. However, it will be understood that in other examples, the arrangement may be reversed with the upper portion 108 fixed to the mount 116 and the lower portion 102 movable to the upper portion 108 and thus to the mount 116 for adjusting the media holding region 106. Also, while the media holder 100 of the present example is configured to provide a height adjustment, in other embodiments, other adjustments (e.g., of the width) and/or combination of adjustments (e.g., of both height and width) may be achieved in accordance with the principles of the present disclosure, and thus the first and second portions may be left and right portions rather than upper and lower portions.

The first and second portions 102 and 108, respectively, may include respective walls that together define a generally rectangular body 166, having a front face or side 168, a right face or side 170, a left face or side 172, a bottom face or side 174, a top face or side 176, and a rear face or side 178. At least a portion of the body 166 may be hollow to accommodate components of the size adjustment mechanism 110. As such, the first and second portions 102 and 108, and more specifically walls of the first and second portions 102 and 108, may define respective first and second housing portions that serve to enclose or shield at least some of the components of the side adjustment mechanism (e.g., the rail and slider of the exemplary side adjustment mechanism).

Each one of the fixed and movable portions of the media holder 100 includes respective media supports or holding features. For example, the first portion 102 includes a first support 104 configured to support one end of the media item 118. The second portion 108 includes a second support 112 configured to support the opposite end of the media item 118. A media holding region 106 is defined between the media supports associated with the first and second portions 102 and 108, respectively, such that varying the relative position of the first and second portions 102 and 108, respectively, varies the relative distance between the media supports and thus the size of the media holding region 106. At least two media supports may be provided in some examples, however in other examples, additional media supports may be provided to support other ends or portions of the media item. The media supports or holding features may be provided by any suitable structures, such as opposing ledges, hooks, clips, or others, which can restrict the movement of the media item 118 in any desired direction, for example in a downward and/or outward direction such as to prevent the media item falling out of the media holder, or sideways to prevent lateral movement of the media item. In various examples, any of the media supports (e.g., the first support 104 or the second support 112) may include one or more pads (e.g., pads 146, 144, respectively) to further secure a media item 118 (e.g., to improve traction between the media item and the supports.

Figure 3:
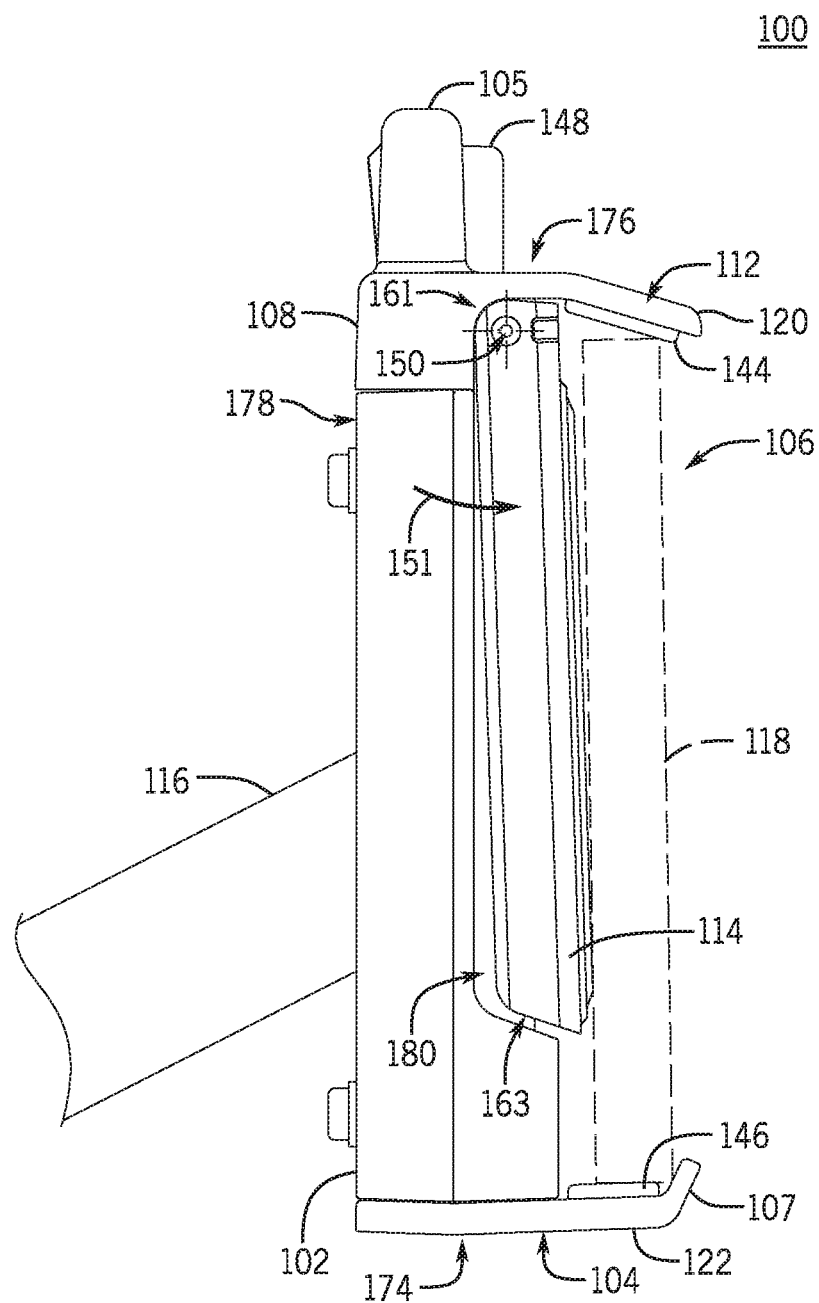
FIG. 3 is a side elevation view of the media holder of FIG. 1 in a first configuration, holding a media item.

In some examples, the first and second supports 104 and 112, respectively, may be fixed to (e.g., rigidly coupled or integrally formed with) the respective one of the first and second portions 102 and 108 such that they extend forward of a front face of the media holder 100. As an example, the first support 104, which may be implemented as one or more first ledges 122, may be fixed to the first (in this case lower) portion 102 to support the bottom end of the media item 118. The first support 104 (e.g., ledges 122) may extend from, in a direction forward of, the front face of the media holder 100, in some examples extending substantially perpendicular to the front face of the first portion 102. The second support 112, which may be provided by one or more second ledges 120 operatively arranged to engage an upper portion (e.g., an upper end) of the media item 118, may be fixed to the second (in this case upper) portion 108. Similar to the first support 104, the second support 112 may extend from, in a direction forward of, the front side of the media holder 100, for example substantially perpendicularly to the front face of the second portion 108. In some examples, at least a portion of one or both of the supports 104, 112 may be oriented (e.g., angled or curved) toward the media holding region 106. For example, as illustrated in FIG. 3, a free end of the second support 112 is angled toward the media holding region 106 and consequently toward the opposite one of the supports 104. The first support 104 includes a lip 107, which is angled or curved upward toward the media holding region 106 and thus also toward the opposite support 112. This arrangement may facilitate a more firm retention of the media item 118 within the media holding region 106.

In some embodiments, the media holder 100 may include additional media supports operatively be arranged to reconfigure the media holder to a smaller sized media holding region than the nominal media holding region 106 of the fully collapsed configuration of the media holder. For example, the media holder 100 may include a third or intermediate media support 114. The third support 114 may be arranged at a location between the first and second supports 104 and 112, such that an edge of the third support can provide a media support or holding feature at an intermediate location between the first and second supports 104 and 112, thus defining a media holding region of yet a smaller size than the nominal size of the media holder 100. The third support 114, shown as a plate or panel in this example, may be movably (in this case, pivotally) coupled to the upper portion 108. The plate, which is pivotally coupled at it upper end to the upper portion of the media holder, may have any suitable length depending on the minimum size of a media item to be accommodated, for example, at least midway between the first and second supports, in some cases about 60-80% of the distance between the first and second supports as in the present example, or in some cases substantially fully to the lower edge.

The third support 114 may be biased (e.g., via a spring 126) away from the body of the media holder such that a lower portion of the third support 114 is moved away from the body 166 (e.g., from the second portion 108), which allows a lower edge 115 of the third support 114 to overlap an upper edge of a smaller media item 118, such as a mobile phone, when the smaller media item 118 is positioned in a landscape orientation as described in more detail below More particularly, the plate-shaped third support 114 is pivoted at its upper or proximal end 161 to the upper portion 108 so that the lower or distal end 163 of the third support 114 can pivot about axis 150 (e.g., in a direction shown by arrow 151). The spring 126, which is fixed to the upper portion 108 (as shown e.g., in FIG. 5A), biases the plate-shaped third support 114 of the present example toward the holding region 106. The biasing force, however, is sufficiently weak so that when a media item with a relatively large dimension relative to the distance from the bottom to the top of the media holder, such as a phone arranged in a portrait orientation or a tablet, is supported by the media holder, the weight of the media item pivots the lower portion of the third support 114 towards the second portion 108.

To prevent over rotation of the third support 114 and retain the third support 114 in engagement with the spring 126, the rotational movement of the third support 114 may be limited, such as by guide arms 138 (see e.g., FIG. 5B) that extend from the rear side 164 of the plate-shaped third support 114. Other suitable structures, some of which may not be pivotally coupled to the body 166, may be used for the third (e.g., rear) support 114, such as a one or a plurality of discrete biasingly coupled plungers or piston heads, arranged over the area of the front face 167 for contact with the rear side of the media item. The plungers may be movably coupled to the front face of the media holder, for example by being supported on individual springs and suitably arranged over the area of the front face to press against the rear side of a media item 118. In some embodiments, the third support 114 may be configured to nest within the front face of the media holder such that the third support 114 can lie substantially flush relative to the front face. In the present example, a recess 180 is defined in the front face of the media holder. The recess 180 is configured to accommodate the third support 114 substantially fully therein to allow the third support 114 to lie flush with the front face of the media holder in some scenarios, such as when sufficient force is exerted against the spring 126 such as by a sufficiently wide media item. In some embodiments, the third support 114 may be sized to be substantially co-extensive with the recess 180, as in the example shown e.g., in FIGS. 1, 3 and 5. In some embodiments, the rear support may be any other suitable structure configured to resiliently support the rear side of the media item. In some embodiments, a rear support may be omitted altogether.

Figure 5A:
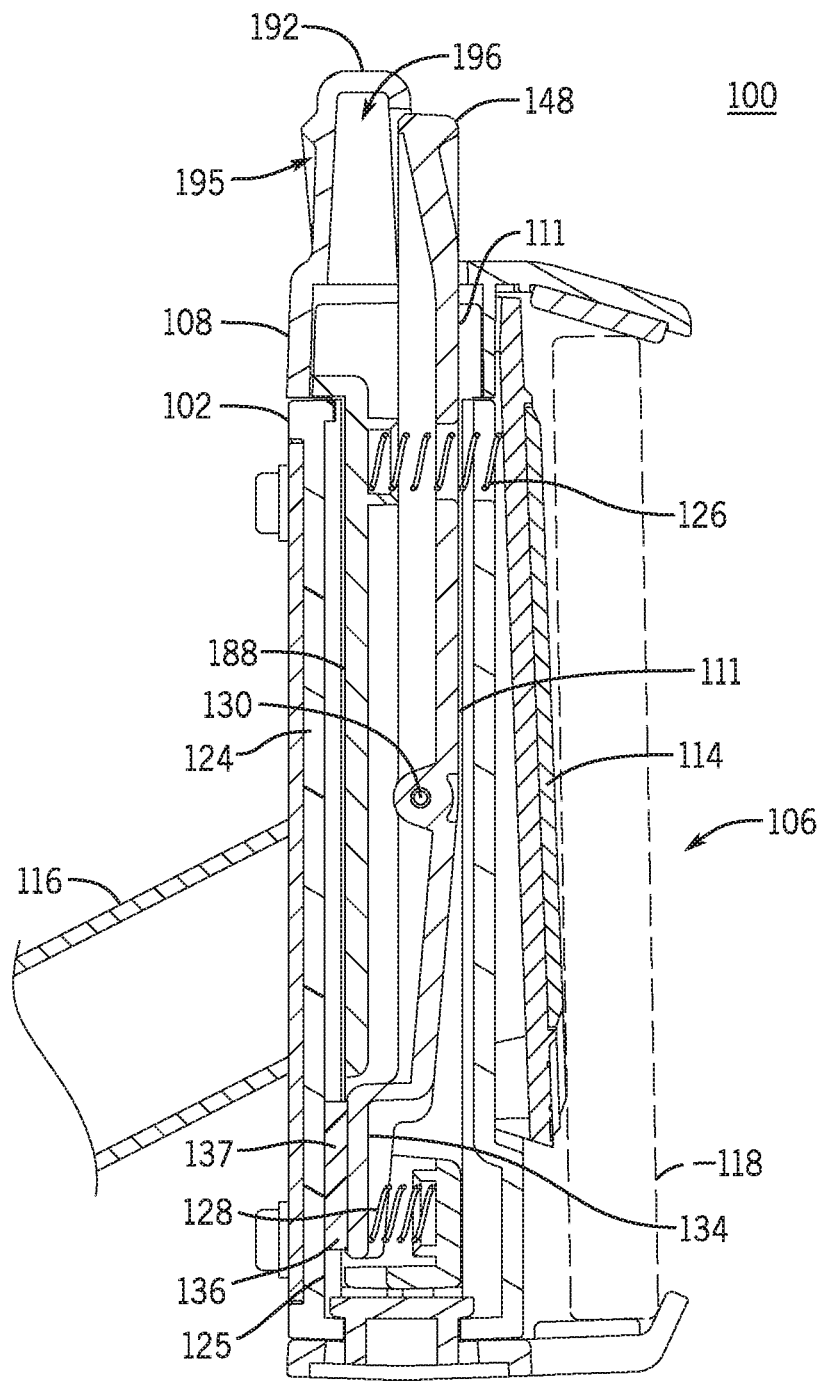
FIG. 5A is a section view of the media holder in the configuration shown in FIG. 3, taken at line 5-5 in FIG. 2.
Figure 5B:
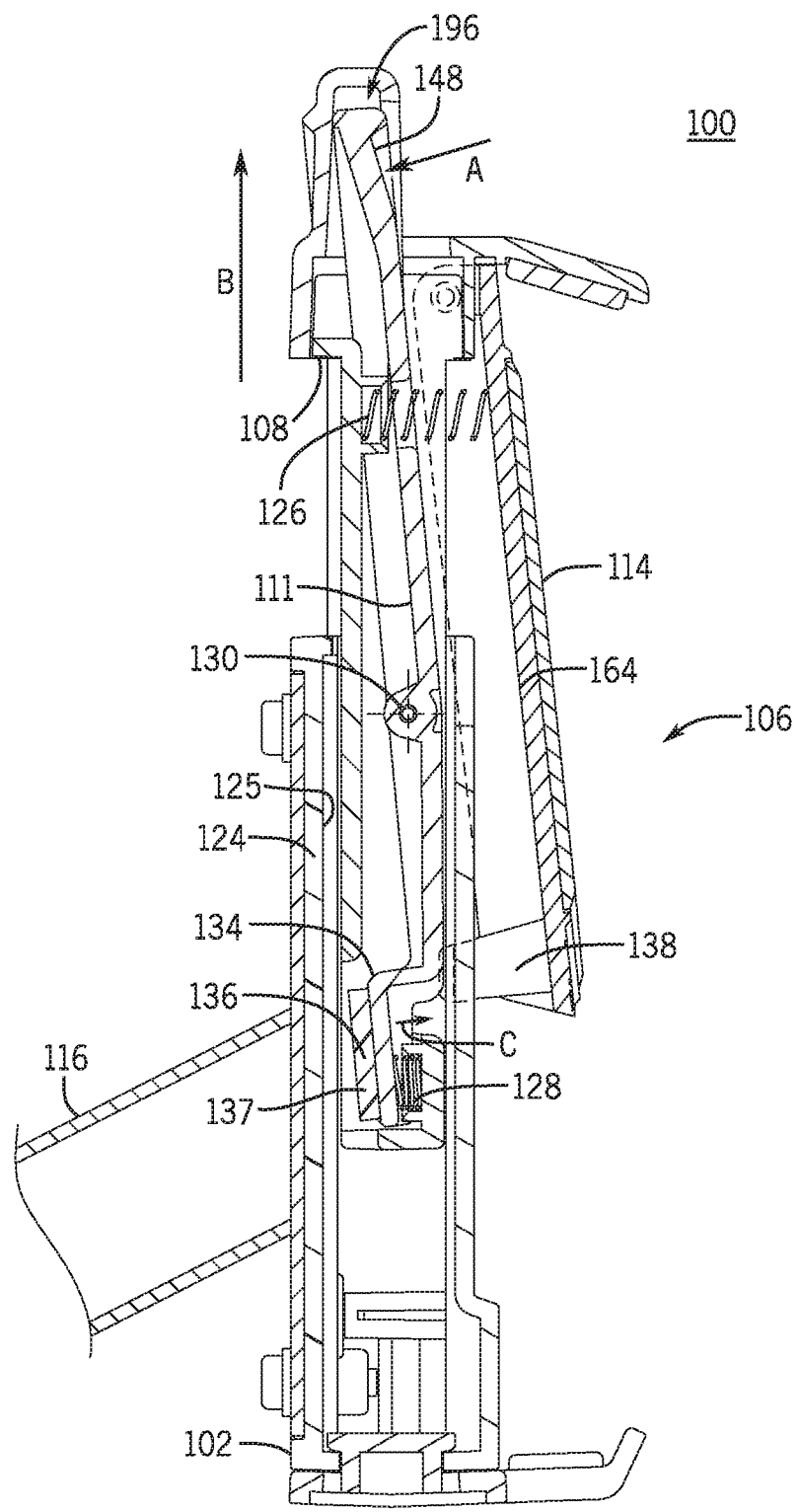
FIG. 5B is a section view of the media holder similar to the view in FIG. 5A illustrating here the operation of the adjustment mechanism to extend the movable portion of the media holder.
Figure 5C:
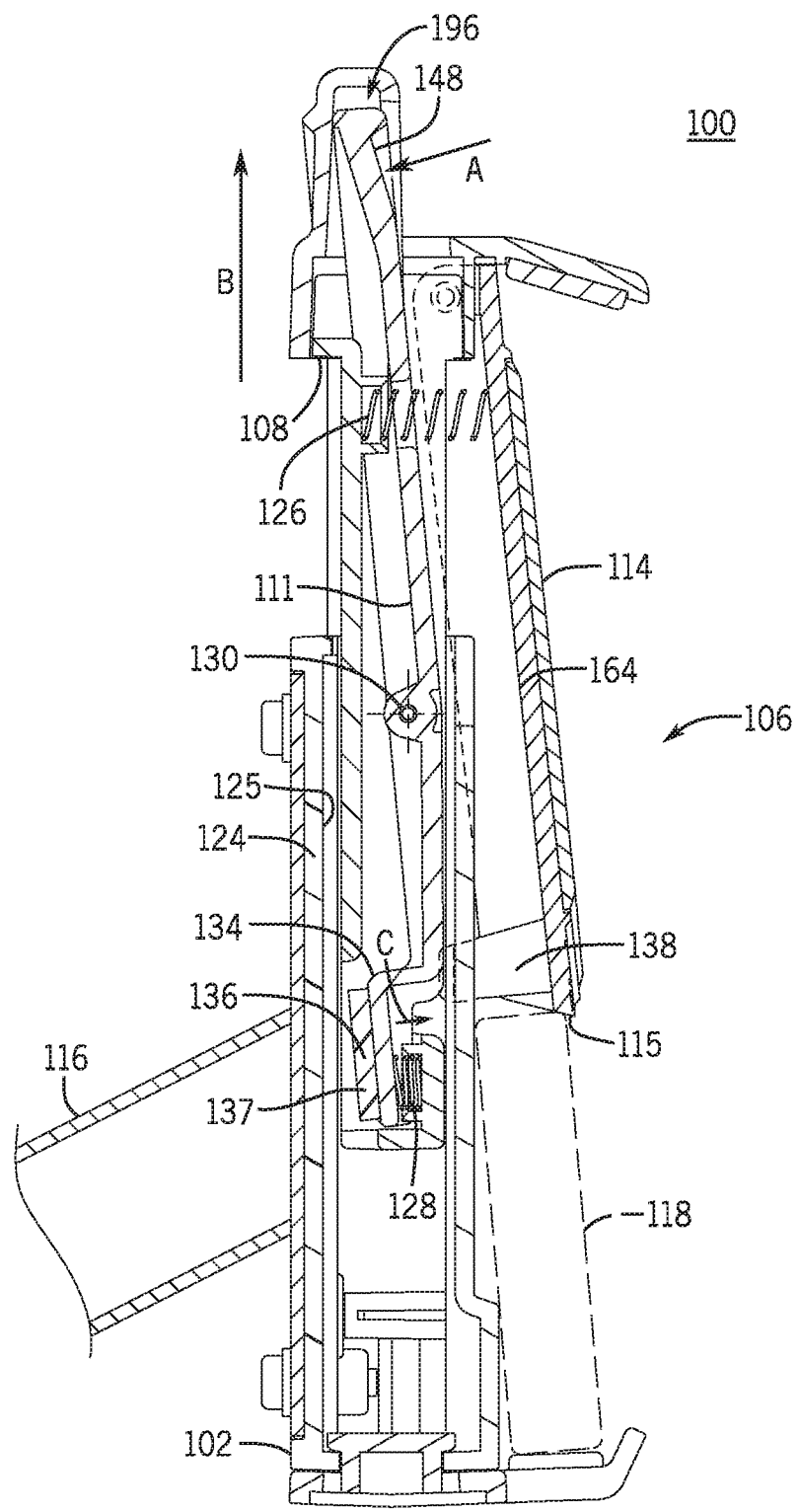
FIG. 5C is a section view of the media holder similar to the view in FIG. 5B illustrating the operation of an example rear support for defining yet a smaller media holding region than in the fully collapsed configuration of FIG. 5A.

As shown in FIG. 5C, a smeller media item 118 (e.g., a smart phone), for example when oriented with its smaller dimension vertically may be supported on the first support 104 and the lower edge 115 of the third support 114 may overlap the media item 118, specifically the upper edge of the media item, to provide two opposing media supports or holding features to secure the media item 118 in the media holder 100. In this configuration, the media holder 100 can hold media items 118 in an orientation that renders their vertical dimension in this orientation to be too small to be secured by the opposing first and second supports of the media holder in its nominal (i.e., i.e. fully collapsed) configuration. As example, such smaller media items 118 that may be placed in the media holder 100 in such a configuration may include a mobile phone, a video or audio player in a landscape orientation, a picture frame, or a small book or notebook an exercise instruction card deck, etc. In the configuration shown in FIG. 5C, the spring 126 biases the third support 114 away from the second portion 108. In this configuration, the lower edge 115 of the third support 114 may overlap an edge of a media item 118. The size of the media holding region 106 may be adjusted to secure the media item 118 between the lower edge 115 and the first support 104. In some embodiments, the first support may include a pad 146 to further secure the media item 118.

Figure 4:
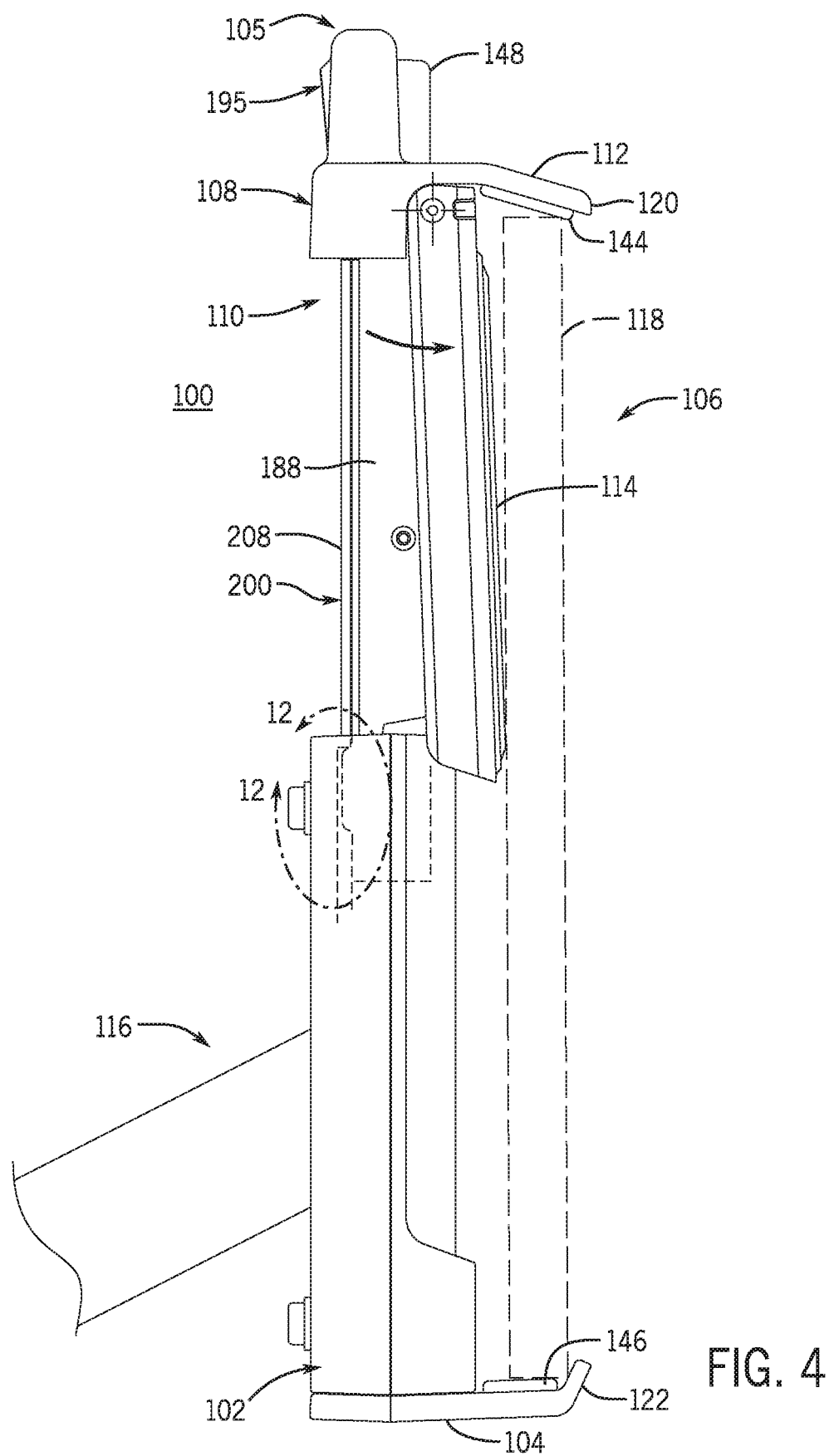
FIG. 4 is a side elevation view of the media holder of FIG. 3 shown in an extended configuration to provide a larger holding region for a media item.
Figure 6:
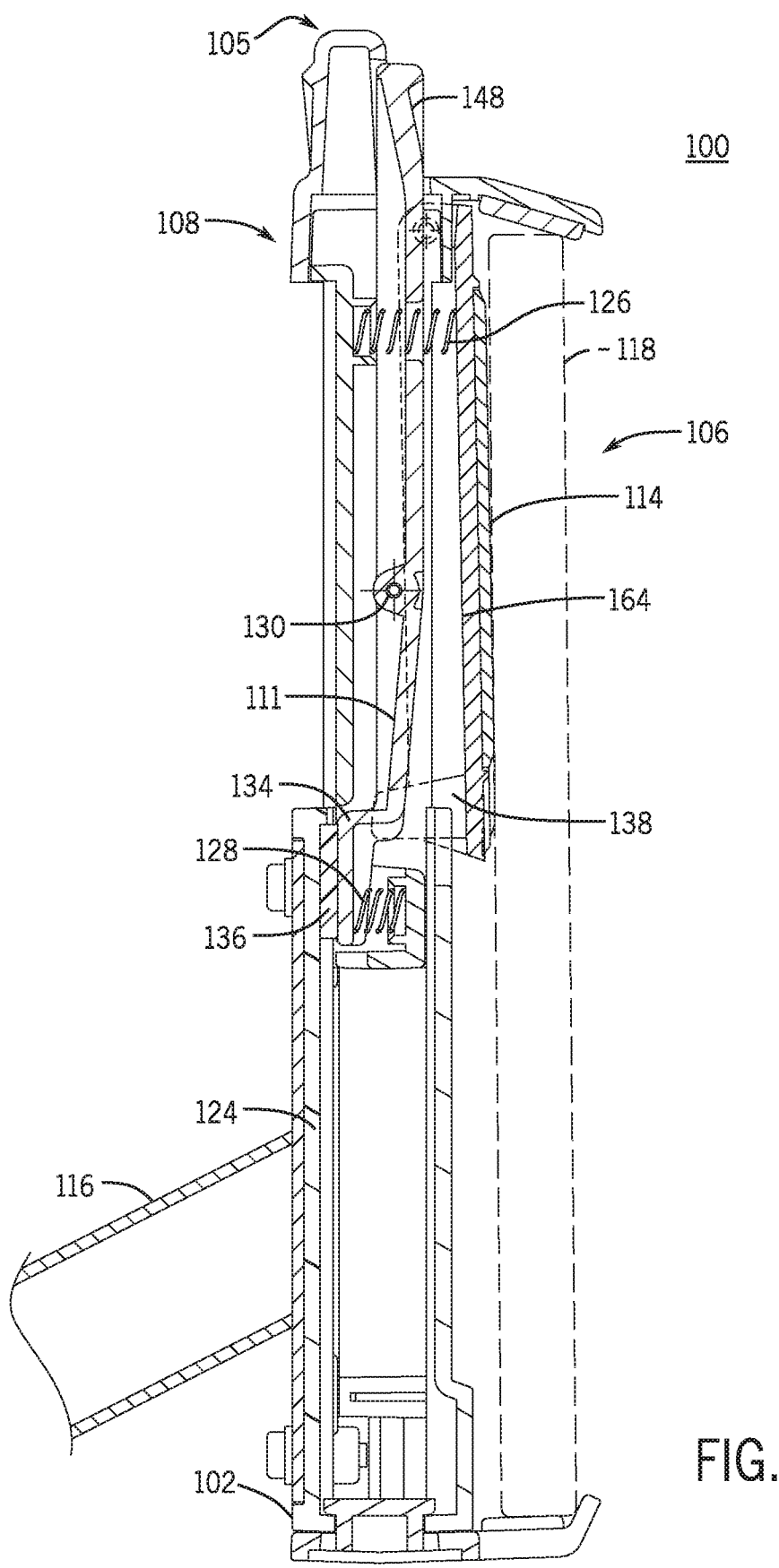
FIG. 6 is another section view of the media holder taken at line 5-5 in FIG. 2 similar to the views shown in FIGS. 5A and 5B, but showing here the media holder in the extended configuration shown in FIG. 4.
Figure 7:
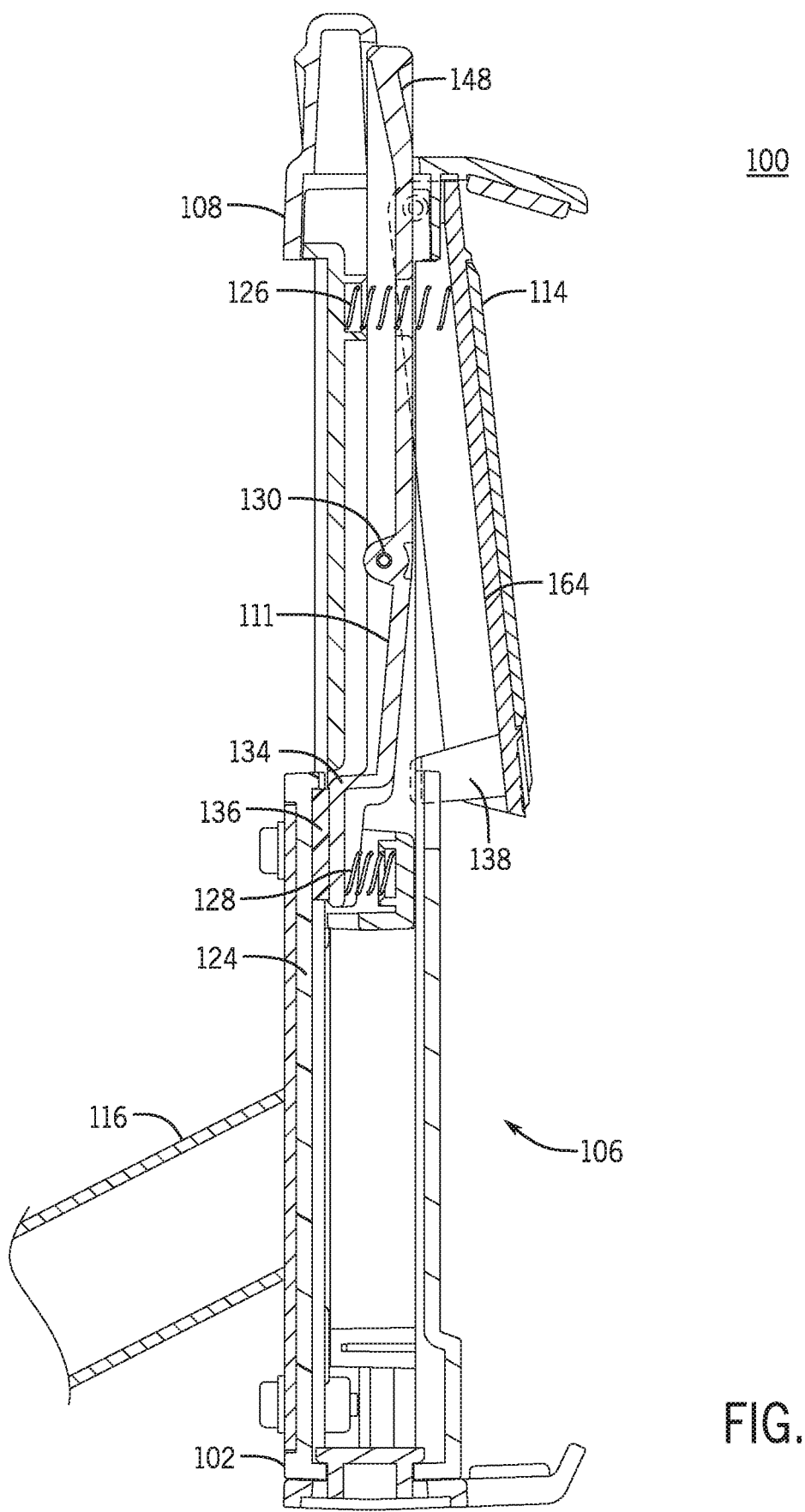
FIG. 7 is yet another section view of the media holder similar to the view in FIG. 6 but with the media item removed to illustrate the unloaded rotational position of the rear support.
Figure 8:
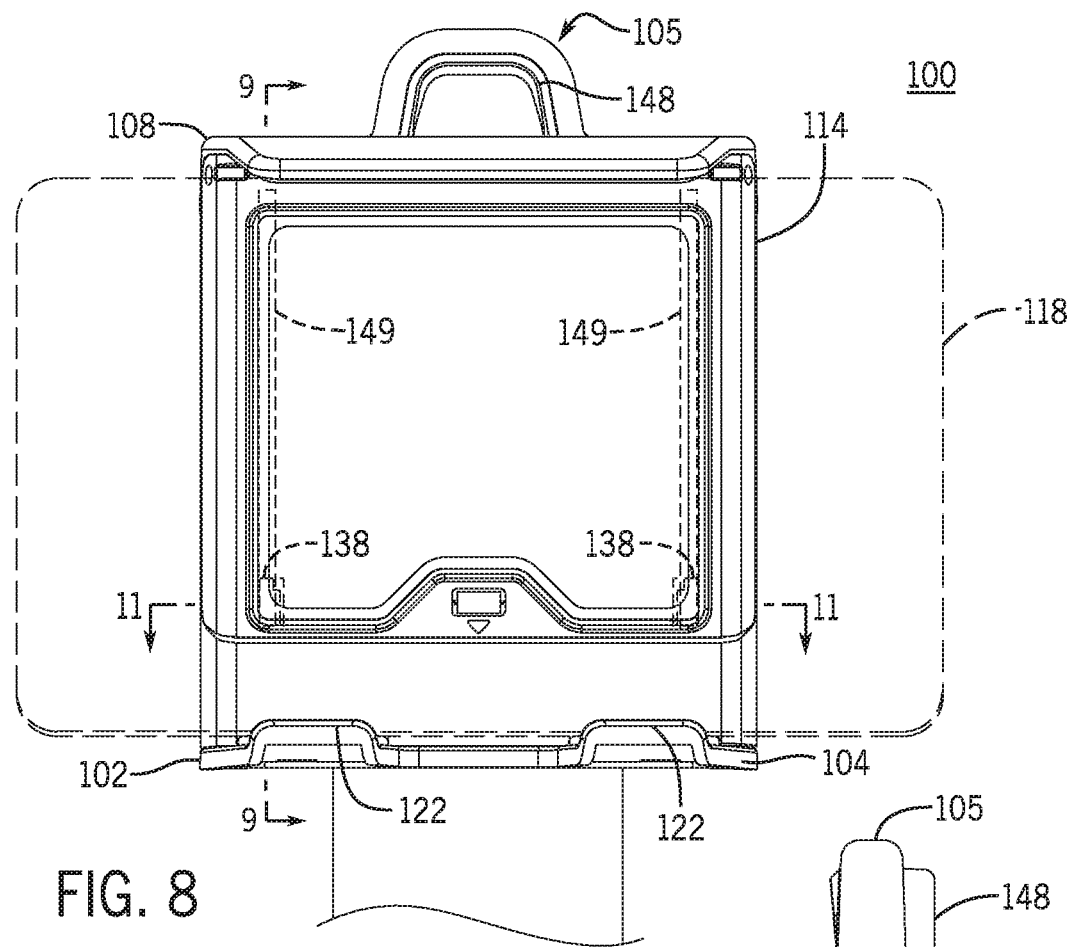
FIG. 8 is a front elevation view of a media holder according to the present disclosure.
Figure 9:
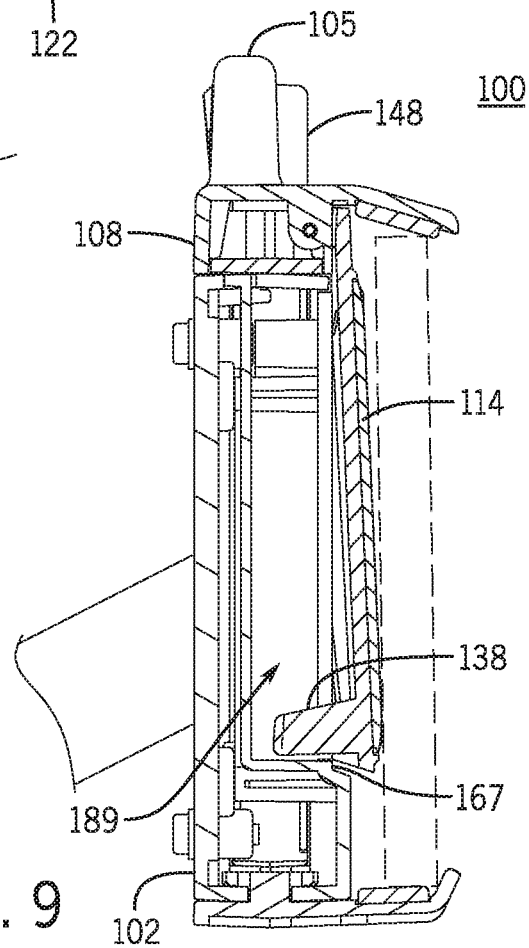
FIG. 9 is a cross section view of the media holder of FIG. 8 taken at line 9-9 in FIG. 8

As described, a media holder according to the present disclosure may be adjustable, such as to enable a user to secure any of a variety of differently sized media items to the media holder and thus to an exercise machine, as an example. The media holder 100 may be adjustable, to vary the size of the media holding region 106, between a first, fully collapsed configuration, as shown in FIGS. 3 and 5A, and which corresponds to the minimum size of the media holding region 106, and a second, fully extended or expanded configuration, as shown in FIGS. 4 and 6, and which corresponds to the maximum size of the media holding region 106. The media holder 100 may be adjustable to a number of intermediate configurations between the fully collapsed and the fully extended configurations, to provide a number of differently sized media holding regions 106 to accommodate a variety of differently sized media items ranging from smaller items, such as smart phones, to larger items such as books, tables, magazines, etc. The media holder 100 may thus include a size adjustment mechanism 110.

The size adjustment mechanism 110 may movably (e.g., slidably) couple the movable portion 108 to the fixed portion 102. In some examples, the size adjustment mechanism 110 may include a slidable coupling between the first and second portions 102, 108. In some examples, the size adjustment mechanism 110 may also include a retention feature to temporarily restrain the movement of the slidable coupling, e.g., until further adjusted by the user, and an actuator operatively engaged with the retention feature to selectively engage and disengage (or release) the retention feature and enable further adjustments.

Figure 10:
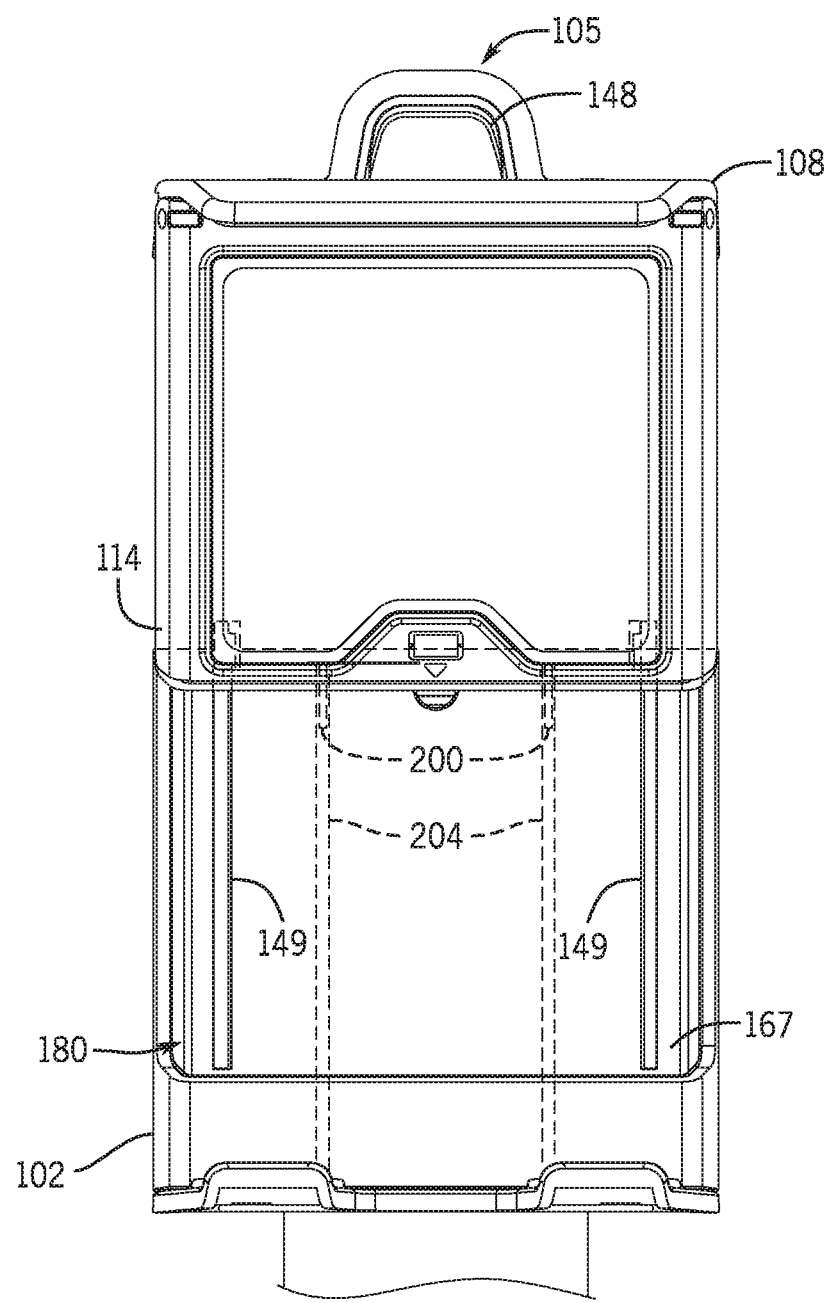
FIG. 10 is a front elevation view of the media holder of FIG. 8 in a second, expanded configuration.

In the present example, the size adjustment mechanism 110 includes a slidable coupling between the upper and lower portions, shown as a rail 200 and track 204 (see e.g., FIG. 10). Referring now further to FIGS. 4, and 10-12, the lower portion 102 of the example media holder 100 includes a plurality of walls that define at least part of the exterior housing of the media holder 100, specifically the lower housing portion or simply lower housing. The lower portion may be substantially hollow, defining a pocket or cavity 189 to receive at least part of the upper portion 108 for slidably coupling the upper and lower portions. The upper portion 108 includes walls that define an upper housing of the media holder, also referred to as upper housing portion or simply upper housing, and further includes a stem 188 that extends into and is received within a cavity 189 of the lower housing. The upper and lower portions 102, 108 may be slidably coupled using an adjustment mechanism, which may include any suitable structure that allows the movable portion, in this case upper portion 108, to be repeatedly expanded and retracted in relation to the fixed portion, in this case the lower portion 102. In the present example, the slidable coupling is implemented using a rail 200 fixed to one of the two portions, in this case the upper portion, and a track 204 fixed to the other one of the two portions, in this case the lower portion, the track 204 configured to slidably receive the rail 200.

In the present embodiment, the rail 200, shown as sets of substantially parallel protrusions 208, extends along a length of the stem 188. The track 204, shown as corresponding sets of grooves 206, extends along a length of an interior of the lower housing. The track 204 is arranged to slidably receive the rail 200 and thus guide the extension of the upper portion 108 by guiding the movement (e.g., restricting degrees of freedom) of the rail 200 along the direction of the track 204, this direction being referred to as the extension/retraction direction. In the present example, two pairs of protrusions 208, one pair on each of the front and rear sides of the stem 188 engage with corresponding two pairs of grooves 206, one pair on the interior of each of the front and rear walls 167 and 124, respectively, of the lower housing. This arrangement, however, is exemplary, and in other examples, a different arrangement of the rail and track may be used, for example using fewer or greater number of protrusions one each or both sides, or using a rail or a different slidable coupling on only one side. In yet other examples, the slidable coupling may be located on other walls of the upper and lower portions, for example, on one or both of the side walls. In some embodiments, portions of the slidable coupling may be exposed during use. In the present example, as shown e.g., in FIG. 4, at least a portion of the rail 200, depending on how far the movable portion 108 is extended, may become exposed (e.g., on the rear side of the media holder 100). In some embodiments, the front part of the rail may be concealed, e.g., by a portion of the upper housing or by the plate-shaped media rear support 114. In some examples, the placement of the rail and track may be interchanged as between the fixed and movable portion. For example, the track (e.g., groove(s)) may be located on the movable portion and the rail (e.g., protrusion(s)) may be located on the fixed portion. In yet other examples, the track or rail may be located on an exterior side of the upper or lower housing, e.g., on an exterior of the side walls of the fixed housing, while the movable portion, instead of having a stem that's received in a cavity, instead includes a component (e.g., a sleeve) that slides over the portion of the fixed housing that includes the track or rail, for slidably engaging therewith. A number of other variations, including using different slidable structures such as rail and sliders (e.g., friction sliders or roller-based sliders, engaging for example opposite sides of the rail) telescoping rods, etc. may be used to implement the slidable coupling between the fixed and movable portions. Also, while in the present examples, the slidable coupling is shown as oriented substantially vertically, for vertical adjustment (e.g., a height adjustment) of the media holder when installed for use, the slidable coupling may be differently oriented in other examples, such as horizontally, for adjusting a different dimension of the media holder.

Figure 12:
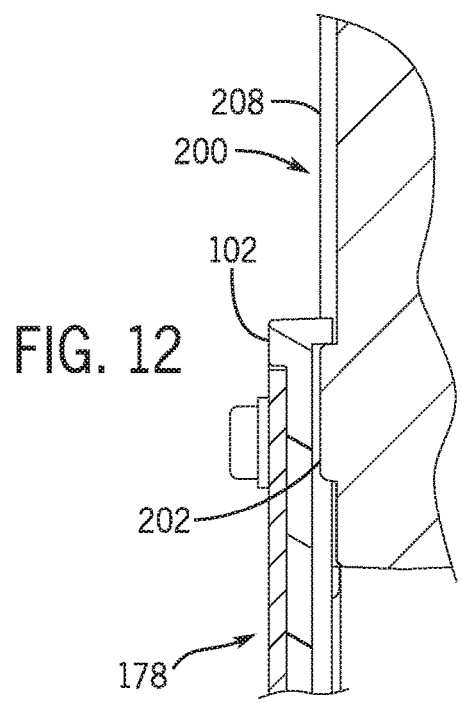
FIG. 12 is a detail section view of the portion of the media holder indicated by line 12-12 in FIG. 4.

The amount of total displacement of the rail 200 relative to the track 204, which may be longer than the total amount of displacement available, may be controlled or limited by a hard stop feature, e.g., as shown in FIGS. 4 and 12. The hard stop feature may be implement through mechanical interference between two structures, each located on the respective one of the fixed and movable portions. For example, a ridge 202 may be provided on the rail or elsewhere on the stem 188 such that the ridge 202 is within and moves freely in the cavity 189 until the stem is extended to the desired maximum position. In such position, the ridge 202 may interfere with a portion of the structure (e.g., an upper portion of the rear wall 124) of the fixed portion 102 to prevent extension beyond or removal of the movable portion 108 from the fixed portion 102. A single or multiple hard stops may be provided between the movable and fixed portions 108 and 102, respectively. In examples, the arrangement of protrusion and blocking structure may be reversed such that the fixed portion includes a protrusion and the movable portion includes one or more blocking or interfering structures to engage the protrusion at the fully extended position.

Referring now also to FIGS. 5A-7, 13, and 14, the size adjustment mechanism may include a retention functionality or feature configured to temporarily fix (e.g., retain or hold) the movable portion, until further adjusted, in any of a plurality of different positions relative to the fixed portion. A variety of retention mechanism can be used for example a friction brake, mechanically interlocking structures (e.g., ratchet, latches, etc.), magnetic interaction or other. With reference to FIGS. 5A-7, the components and operation of a friction-based retention mechanism will be described. As shown in FIG. 5A, the media holder may include a lever arm (or simply arm) 111, which in the present example is pivotally coupled to the movable upper portion 108 such that the arm 111 pivots about the substantially horizontal lever arm pivot axis 130. A proximal end 134 of the lever arm 111 supports an engagement member 136, which in this case is a friction member, shown here as friction pad 137. In other embodiments, the proximal end 134 of the arm 111 does not have an engagement member 136, friction member, or friction pad, and interacts frictionally with the engagement member 125 of the lower portion 102. In other embodiments, the lower portion 102 does not have an engagement member 125, and the proximal end of the arm 111 supports an engagement member 136 that interacts frictionally with the with the rear wall 124 of the body 166. In still other embodiments, the proximal end 134 of the arm 111 does not have an engagement member 136, the rear wall 126 does not have an engagement member 125, and the proximal end 134 interacts frictionally with the rear wall 124 of the body 166.

The proximal end 134 of the arm 111 may thus also be referred to as the engagement end 134 of the lever arm 111. The opposite, distal end 148 of the lever arm 111, which may also be referred to as the actuation end (or simply actuator) 148, is exposed through the housing of the media holder 100 and thus accessible to the user. The lever arm 111 is biased (e.g., via spring 128) toward the engagement direction, in this case toward the rear wall 124 of the body 166.

The fixed lower portion 102 includes a cooperating engagement member 125, in this example another friction member such as a friction sheet (or simply sheet). The friction sheet provides an engagement surface for the friction pad 137. The friction sheet may be implemented using any suitable material (e.g., a polymer, an elastomer or others) that in combination with the friction properties of the friction pad and biasing force of the spring 128, provides sufficient static friction to hold the upper portion 108 in any of the adjusted positions including the fully expanded position of FIGS. 4, 6 and 7, irrespective of the presence of a media item in the media holding region 106. In some embodiments, as shown in FIG. 5A, the engagement member 125 (here, friction sheet) may be integrated with the rear wall 124 of the lower housing. For example, the rear wall 124 of the lower housing may be formed or include on its interior the suitable friction material providing the friction sheet. In some examples, the interior of the wall 124 may be treated (e.g., sprayed or coated) with a friction enhancing material, such as an elastomer or other relatively higher friction polymer, or otherwise treated or processed to increase the surface roughness of the interior surface of the rear wall. In some embodiments, the friction sheet may be formed as a separate component and subsequently fixed (e.g., adhered, bonded, fastened, fused, laminated, in-molded or co-molded) to the interior side of the rear wall 124. It should be noted that while the engagement (e.g., friction) member 136 on the lever arm 111 is shown here as engaging the rear wall 124 of the fixed portion 102, in other examples, the engagement (e.g., friction) member 136 may engage a different wall, such as the front wall of the fixed portion 102. Also, in the present example, the arm 111 is pivotally coupled to the upper portion 108 and configured to move with the upper portion 108 during size adjustments. However, in other examples, the arm 111 may be pivoted off the fixed portion 102 and the cooperating engagement member 136 may be located on the movable portion 108. The two friction members may be implemented using materials having suitable relative friction characteristics under the loading provided by the spring 128, for example elastomeric materials such as rubber (natural or synthetic), silicone, or other resilient materials, or non-elastomeric materials providing sufficient surface roughness.

To facilitate the movement of the movable portion 108 into an expanded position, the media holder 100 may include a handle 105. The handle 105 may be positioned at a location readily accessible to the user during exercise and configured to be manipulated (e.g., gripped, pressed, levered, pushed or pulled on) to adjust the relative position of one of the first and second housing portions 102, 108 with respect to the other. In the present example, the handle 105 includes a protrusion 192 extending from the upper side 176 of the body 166. The protrusion 192 may be configured to allow the user to at least partially hook his or her fingers around the protrusion 192 to enhance the grip as the user manipulated the handle 105. In the present example, the protrusion a recess 195 on the rear side of the protrusion 192 for enhancing the grip. Different suitable structures, such hooks or nubs and/or surface treatments (e.g., an elastomeric coating) may additionally or alternatively be used in other examples for enhancing the grip. The handle 105 further includes the actuator 148 to enable one hand operation of the size adjustment mechanisms 110. In other examples, the actuator that releases the retention features may be separate from the handle 105 and the user may thus use two hands to operate the size adjustment mechanism 110. In the preset example, with the actuation end 148 of the lever arm 111 being exposed on the front side of the protrusion 192, the handle 105 provides an easy to operate arrangement for actuating the size adjustment mechanism, such as by enabling the user applying a squeezing and a pulling or pushing force with one hand, which effects both a release of the retention feature (e.g., friction brake) and subsequently a displacement of the movable portion 108 relative to (e.g., away from) the fixed portion 102.

As illustrated in the figures, to operate the size adjustment mechanism, the user applies a force to the actuation end 148 of the arm 111 (e.g., as shown by arrow A in FIG. 5B) depressing the actuation end 148 of the arm 111 into the cavity 196 defined by protrusion 192. This action pivots the lever arm 111 about the axis 130, against the force of the spring 128, to cause the engagement end 134 of the lever arm 111 to move away (e.g., as shown by arrow C) from the engaged position, lifting the engagement member 136 (e.g., friction pad 137) off the cooperating engagement member 125. With the friction brake released, a pulling force on the handle 105 (e.g., as shown by arrow B in FIG. 5B), causes the movable portion 108 to displace away from the fixed portion 102 to enlarge the size of the media holding region 106 as desired, up to the fully extended configuring in FIG. 6. To contract or reduce the size of the media holding region 106, the user again releases the retention mechanism, here the friction brake, by pressing on the actuation end 148 of the lever arm 111, and pushes down on the movable portion 108 (e.g., by exerting a downward force applied to the protrusion 192) to move the upper portion 108 toward the lower portion 102. The contraction of the media holding region 106 may be performed concurrently with, e.g., by the user manipulating a media item 118 with one hand and the handle 105 with the other, or after placement of the media item 118 in the holding region 106. In either scenario, the user may expand the media holding region 106 beyond a size needed to accommodate the media item 118 and after positioning the media item 118 in the holding region, the user may further manipulate the handle 105 to contract the media holding region 106 to a size in which the first and second supports secure the media item 118 to the media holder 100. Upon adjustment of the media holding region 106 to a desired size, the user may release the actuator 148, which releases the force acting against spring 128 allowing the spring 128 to return or bias the engagement end 134 of the lever arm 111 into the engaged position.

Figure 11:
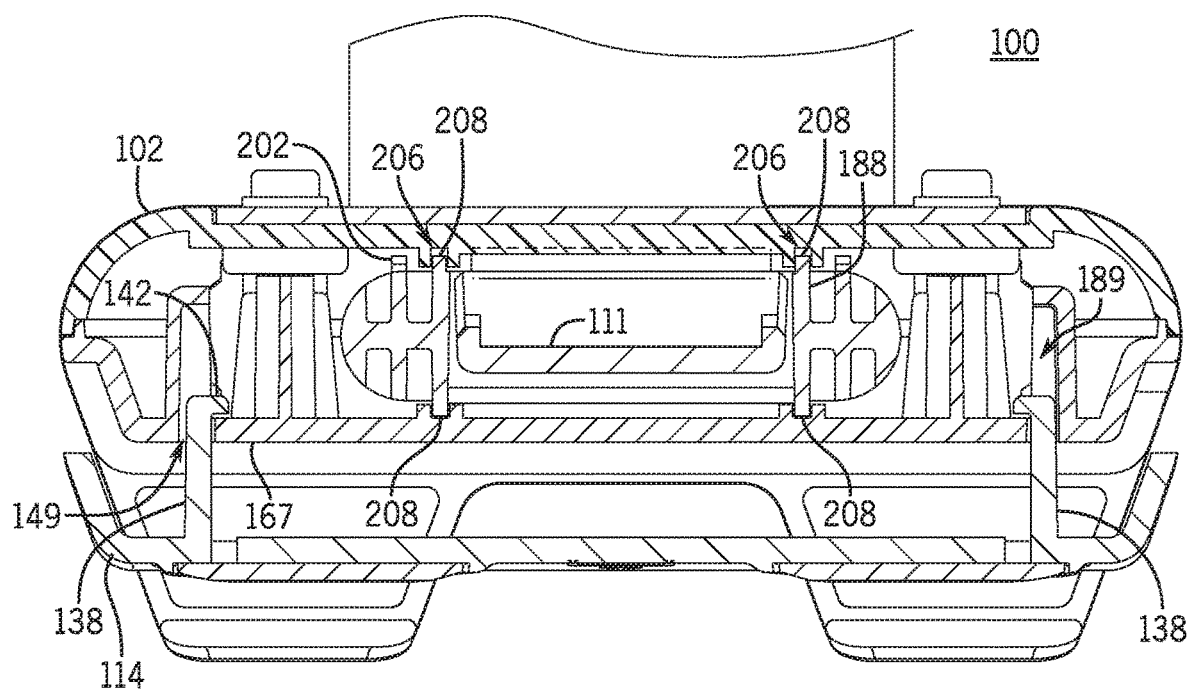
FIG. 11 is a cross section view of the media holder of FIG. 8, taken at line 11-11 in FIG. 8.

Referring now also to FIGS. 8-11, over rotation of the third support 114 may be prevented by limiting the rotational movement of the third support 114, for example by guide arms 138 extending rearward of the rear side 164 of the third support 114 or other suitable structure that movably engages the body 166 to permit only a desired amount of movement (in this case rotation) under the force of spring 126. As shown in FIG. 11, one or both of the guide arms 138 may include a tang 142 extending transversely to the guide arm 138 so as to interfere with the removal of the guide arm 138 from a respective slot 149 defined in the front wall of the lower housing. As such, the guide arms 138 may be free to move into and out of the cavity 189 through the slots 149, but full removal of the guide arms 138 from the cavity is be prevented by the interference of the tangs 142 with the wall 167, in which slots 149 are formed.

Figure 13:
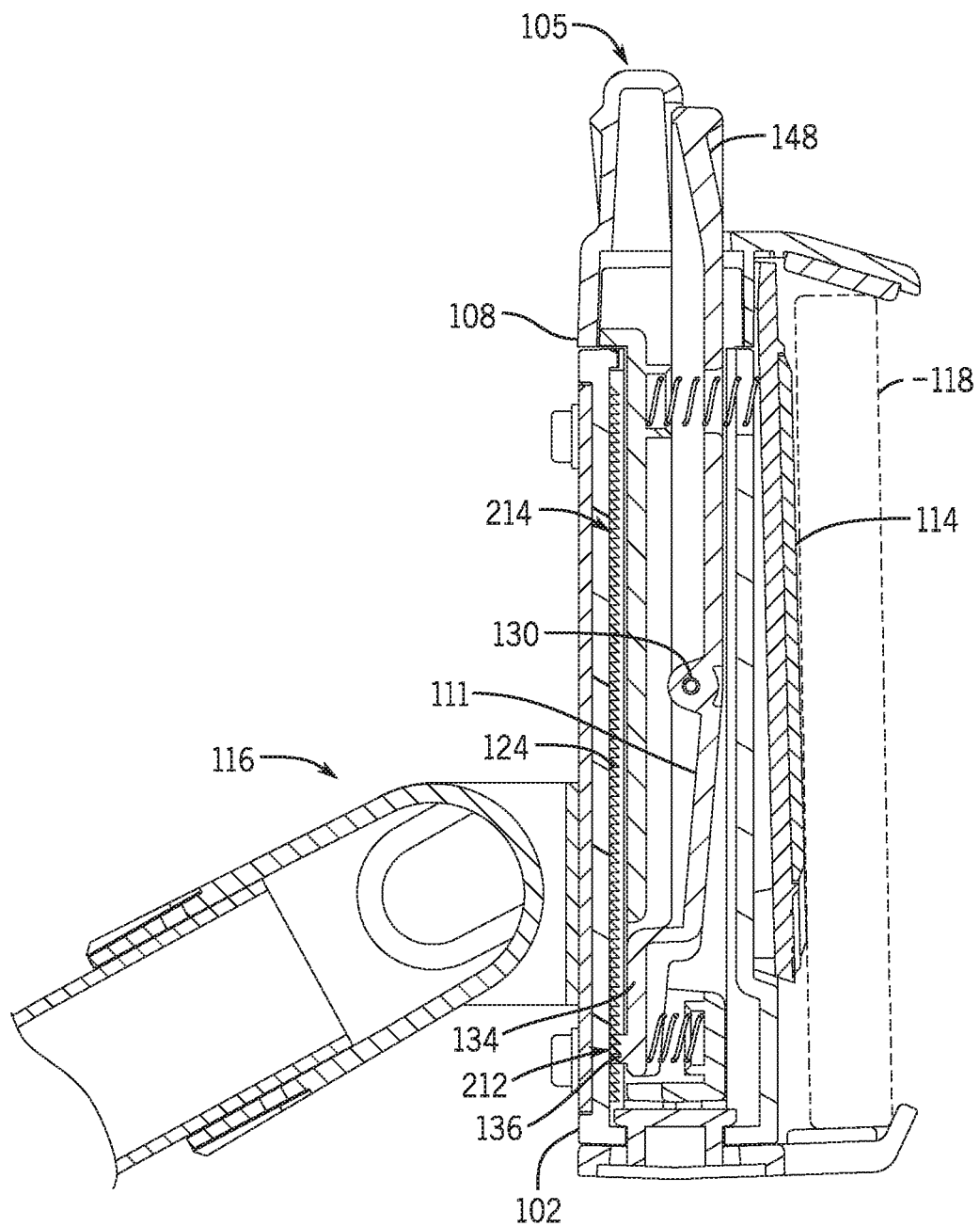
FIG. 13 is a cross section view of a media holder according to further examples of the present disclosure.
Figure 14:
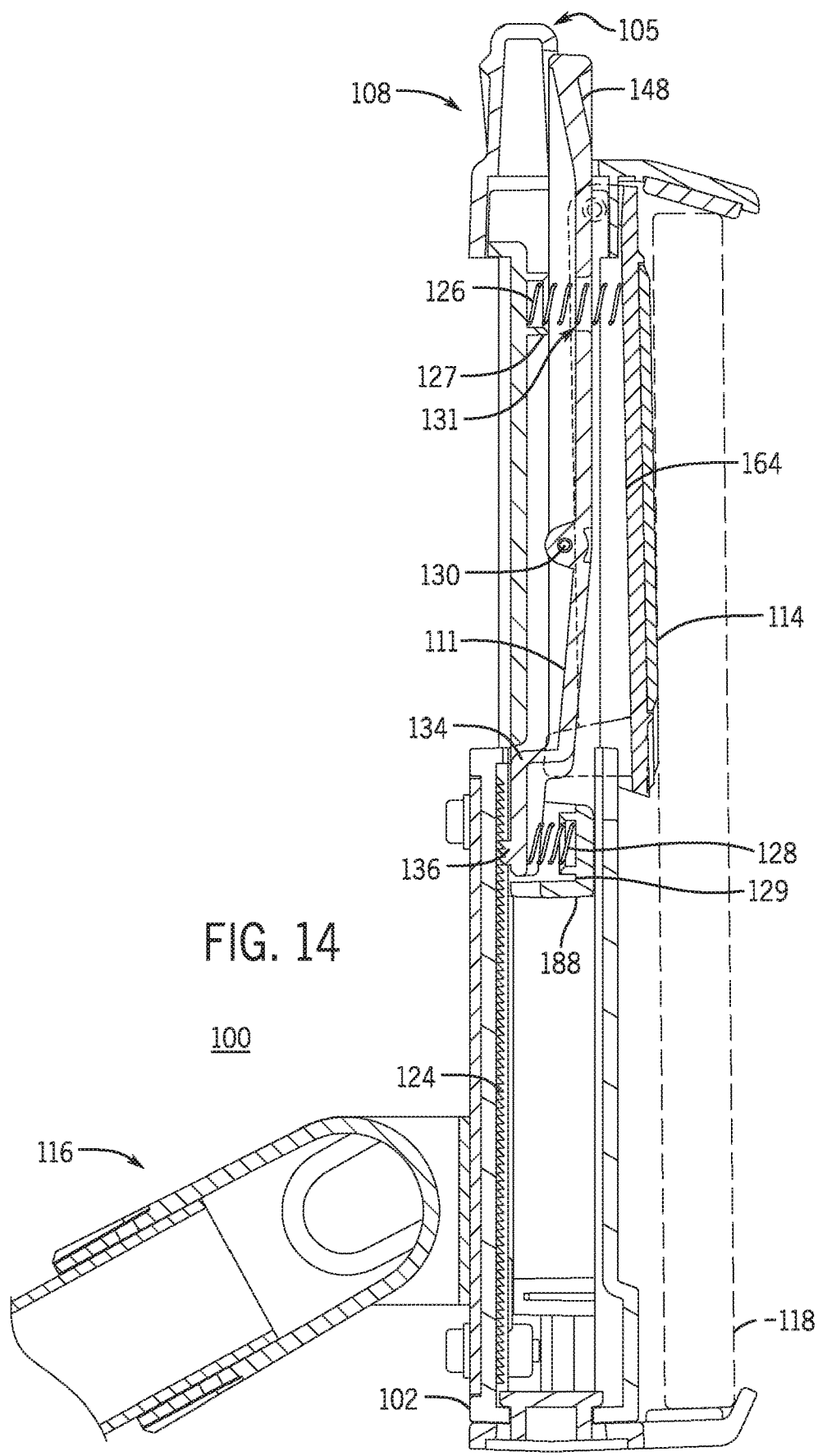
FIG. 14 is a cross section view of the media holder of FIG. 13 in a second, expanded configuration.

As described, the media holder may employ a retention mechanism different from a friction brake, for example using mechanically interlocking features, such as a ratchet, or magnetically interacting features. Referring now to FIGS. 13 and 14, a ratchet-type retention mechanism is described. In some such examples, one of the engagement members (e.g., first engagement member 125) may be implemented as a ratchet strip having a plurality of teeth 214 arranged along the adjustable direction of the media holder. The other engagement member (e.g., second engagement member 136) may be implemented as a pawl configured to engage the ratchet strip. The pawl may be implemented using one or a plurality of interlocking members or teeth 212, which interlock with to engage the teeth 214, e.g., as shown in FIGS. 13 and 14, and thus define the plurality of size-adjustment positions. The size adjustment mechanism may be configured to provide anywhere between a few to a very large number of increments or positions for size adjustment, such as by tailoring the density (or pitch) of the teeth 214, or provide nearly continuous, rather than discrete, adjustability between the minimum and maximum positions, such as when using a friction brake. In the present example, the ratchet strip may have anywhere from a few teeth 214 for only a few discrete adjustment positions to a large number of teeth 214, up to 50, up to 80, up to 100 or greater in some cases, to obtain the desired granularity of adjustments.

To contract or expand the media holding region 106, the user may disengage the retention mechanism, e.g., by pressing on the actuator 148, which pivots the engagement end 134 of the lever arm 111 and thus the second engagement member (e.g., pawl) 136 away from the first engagement member (e.g., ratchet strip) 125 allowing the user to adjust the position of the upper portion 108 in relation to the lower portion 102. In some examples, the first and second engagement members 125 and 136 may be configured to allow movement of the second portion 108 toward the first portion 102 while the first and second engagement members 125 and 136 are engaged, but effectively prevent movement of the second portion 108 in the opposite direction (i.e., away from the first portion 102) while the first and second engagement members 125 and 136 are engaged. For example, the retention mechanism may be configured to resist adjustment of the media holder one direction (e.g., the expansion direction) more than in the opposite direction (e.g., the contraction direction, effectively allowing the user to adjust in one direction (e.g., size down) but not the other direction (e.g., size up) without disengaging the retention mechanism. This can be achieved by angling the teeth of the ratchet strip and pawl 214 and 212, respectively, such that the teeth 214 provide shallower ramp(s) for the teeth 212 in one direction of travel (e.g., the contraction direction) while being more steeply inclined, in some cases substantially perpendicularly, in the other direction of travel (e.g., the expansion direction). As such, and when the user applies a sufficient force in the less-resisted direction of travel, the biasing force of the ratchet may be overcome to allow the pawl to advance over the shallower ramp(s), without having to manually disengage the pawl from the ratchet strip. However, advancement of the pawl in the opposite direction may be sufficiently heavily resisted to in effect prevent an adjustment in that direction without disengage the pawl from the ratchet strip. Such an arrangement may improve the user's experience by allowing quicker down-sizing (e.g., cinching against the media item) to improving efficiency while preventing accidental enlargement and thus decoupling of the media item, unless intended by the user as evidenced by manipulation of the actuator 148.

The size adjustment mechanism may further facilitate this "locking out" function by being configured to reduce or limit the amount of force that can be applied by the user in the more-resisted direction, without manipulating the retention mechanism, which may reduce the risk of damage to the retention mechanism. For example, the grip enhancing features (e.g., recess 195) of the handle 105, described previously with reference to FIG. 5A, may be configured to provide some but limited grip enhancement. Referring specifically in the example in FIG. 5A, the recess 195 may be sufficiently shallow in its depth and/or the inclination of the upper wall to prevent the user from effectively hooking their finger(s) into the recess 195 and applying excessive force on the ratchet strip, without manipulating the actuator 148. With the actuator 148 and the limited grip enhancement feature (recess 195) disposed on opposite sides of the handle 105, the arrangement effectively limits the amount of gripping force that can be applied by the user in order to pull on the handle before the user may need to depress the actuator, which would thus avoid damage to the ratchet.

As further illustrated in FIG. 14, the biasing elements (e.g., springs 126 and 128), which bias the rear support 114 and the lever arm 111, respectively may be housed in the upper portion 108 and coupled thereto such that they translate with the upper portion 108. As such, respective ones of the springs 126 and 128 reside in a respective seat 127 and 129, each shown here as an annular boss sized to accommodate the coil springs within. In other examples, the spring may be positioned over the boss, with the boss located within the coil of the spring. As illustrated, the two biasing elements (e.g., springs 126 and 128) are fixed to oppose sides (e.g., rear and front side) of the upper housing and act in opposite directions. That is, in this example, the spring 126 is received in a seat 127, shown as boss extending from the rear wall of the upper housing, and the spring 128 is received in a seat 129, shown as a boss extending from the front wall 167 of the upper housing. In some examples, one or more of the springs may pass through intermediate structure to reach the movably component which it biases. For example, the spring 126 passes through an aperture 131 defined by the lever arm 111 to engage the rear side 164 of the third support 114. Other arrangements may be used, such as using a pair of springs on opposite sides of the lever arm 111 for biasing the third support 114 at two spaced apart locations. While the biasing elements (e.g., springs 126 and 128) that biasing the rear media support 114 and the lever arm 111, respectively, are illustrated as coil spring, it will be understood that other suitable biasing elements, such as different types of springs, one or more resilient rods or other resiliently deformable structures, may be used.

All relative and directional references (including: upper, lower, upward, downward, left, right, leftward, rightward, top, bottom, side, above, below, front, middle, back, vertical, horizontal, and so forth) are given by way of example to aid the reader's understanding of the particular examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

Those skilled in the art will appreciate that the presently disclosed examples teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An exercise machine comprising:
   a media holder including:
      a first portion comprising a first support configured to support one end of a media item;
      a second portion moveably coupled to the first portion and comprising:
         a second support configured to support an opposite end of the media item such that a media holding region is defined between the first and second supports; and
      a size adjustment mechanism moveably coupling the second portion to the first portion for adjusting a dimension of the media holding region, wherein the size adjustment mechanism includes an arm pivotally joined to the second portion and selectively engaged with the first portion to retain the second portion in any of a plurality of positions with respect to the first portion irrespective of a presence of the media item in the media holding region; and
   a mount fixed to the first portion and coupling the media holder to a frame of the exercise machine.

2. The exercise machine of claim 1, wherein the frame supports an exercise assembly including at least one movable component configured to be driven by a user during exercise, and wherein the media holder is coupled to the frame at a location within the user's reach during exercise.

3. The exercise machine of claim 1, wherein the size adjustment mechanism comprises a friction ember coupled to the first portion and configured to frictionally engage the arm to resist movement of the second portion relative to the first portion.

4. The exercise machine of claim 3, wherein the friction member comprises an elastomeric pad fixed to the first portion.

5. The exercise machine of claim 4, wherein a first end of the arm is biased toward the elastomeric pad.

6. The exercise machine of claim 5, wherein a second end of the arm opposite the first end is configured for actuation by a user of the exercise machine.

7. The exercise machine of claim 1, wherein the arm includes a pawl configured to selectively engage a plurality of teeth supported by the first portion.

8. The exercise machine of claim 1, wherein the first support comprises a lower ledge extending from a lower end of the first portion, and wherein the second support comprises an upper ledge extending from an upper end of the second portion.

9. The exercise machine of claim 8, wherein a free end portion of one of the upper and lower ledges is oriented toward the other one of the upper and lower ledges.

10. The exercise machine of claim 8, wherein the media holding region comprises a first media holding region, the media holder further comprises a third support positioned between the first and second supports and configured to engage an edge of the media item to define a second media holding region smaller than the first media holding region.

11. The exercise machine of claim 10, wherein the third support comprises a plate pivotally coupled to the second portion and biased toward the first media holding region.

12. The exercise machine of claim 11, wherein a lower edge of the plate is configured to engage an upper edge of the media item.

13. The exercise machine of claim 12, wherein the lower edge of the plate is angled toward the first support.

14. A media holder for an exercise machine, the media holder comprising:
- a first portion configured to be mounted to a frame of the exercise machine and to support one end of a media item;
- a second portion slidably coupled to the first portion and configured to support an opposite end of the media item;
- a size adjustment mechanism slidably coupling the first and second portions, the size adjustment mechanism comprising an arm pivotally coupled to the second portion such that the arm moves with the second portion and configured to selectively engage a retention member fixed to the first portion to retain the second portion in a plurality of different positions relative to the first portion; and
- a mount fixed to the first portion for coupling the media holder to the exercise machine.

15. The media holder of claim 14, wherein the retention member comprises a plurality of teeth and wherein the arm comprises a pawl configured to engage the teeth.

16. The media holder of claim 14, wherein the first portion comprises a friction pad selectively engageable with the arm to define the plurality of positions of the second portion relative to the first portion.

17. A media holder for an exercise machine, the media holder comprising:
- a first portion configured to be mounted to a frame of the exercise machine and to support one end of a media item;
- a second portion slidably coupled to the first portion and configured to support an opposite end of the media item; and
- a size adjustment mechanism slidably coupling the first and second portions, the size adjustment mechanism comprising an arm pivotally coupled to the second portion such that the arm moves with the second portion and configured to selectively engage a retention member fixed to the first portion to retain the second portion in a plurality of different positions relative to the first portion, wherein the first portion comprises a first housing portion enclosing the retention member, and wherein the second portion comprises a second housing portion configured to provide access to an end of the arm opposite the retention ember.

18. The media holder of claim 17, wherein the first portion comprises a first support and the second portion comprises a second support, wherein a media holding region is defined between the first and second supports, and wherein movement of the second portion in relation to the first portion adjusts a height of the media holding region.

19. The media holder of claim 18, wherein:
- the first support comprises a first ledge extending from the first housing portion;
- the second support comprises a second ledge extending from the second housing portion; and
- at least one of the first and second ledges extends towards the other one of the first and second ledges such that a dimension of the media holding region decreases with distance away from the first and second housing portions.

20. The media holder of claim 18, further comprising a third support positioned between the first support and the second support, wherein the third support is configured to engage an edge of the media item to define a smaller media holding region.

* * * * *